US005178116A

United States Patent [19]

Fehrenbach et al.

[11] Patent Number: 5,178,116

[45] Date of Patent: Jan. 12, 1993

[54] VALVE FOR METERED ADMIXING OF VOLATILIZED FUEL TO THE FUEL/AIR MIXTURE OF AN INTERNAL COMBUSTION ENGINE

[75] Inventors: Siegfried Fehrenbach, Markgroeningen; Erwin Krimmer, Pluederhausen; Wolfgang Schulz, Bietigheim-Bissingen, all of Fed. Rep. of Germany

[73] Assignee: Robert Bosch GmbH, Stuttgart, Fed. Rep. of Germany

[21] Appl. No.: 834,562

[22] PCT Filed: Jul. 17, 1991

[86] PCT No.: PCT/DE91/00585

§ 371 Date: Feb. 14, 1992

§ 102(e) Date: Feb. 14, 1992

[87] PCT Pub. No.: WO92/01862

PCT Pub. Date: Feb. 6, 1992

[30] Foreign Application Priority Data

Jul. 20, 1990 [DE] Fed. Rep. of Germany ....... 4023044

[51] Int. Cl.[5] ...................... F02M 33/02; F02M 39/04; F16K 31/02

[52] U.S. Cl. .................................... 123/518; 137/599; 137/614.2; 251/129.21; 123/520

[58] Field of Search ............... 123/516, 518, 519, 520, 123/521, 458; 251/129.21, 129.05; 137/699, 589, 614.2, 144

[56] References Cited

U.S. PATENT DOCUMENTS

| | | | |
|---|---|---|---|
| 3,007,672 | 11/1961 | Tischler | 251/129.21 |
| 3,231,233 | 1/1966 | Herion | 251/129.21 |
| 3,521,851 | 7/1970 | Sorrow | 251/129.21 |
| 3,758,071 | 9/1973 | Anderson et al. | 251/129.21 |
| 4,102,526 | 7/1978 | Hargraves | 251/129.21 |
| 4,240,468 | 12/1980 | Brand et al. | 251/129.21 |
| 4,577,607 | 3/1986 | Nishio | 123/519 |
| 4,628,887 | 12/1986 | Mitchell et al. | 123/520 |
| 4,700,682 | 10/1987 | Ota et al. | 123/516 |
| 4,763,635 | 8/1988 | Ballhause et al. | 123/520 |
| 4,838,519 | 6/1989 | Buffet et al. | 251/129.21 |
| 4,944,276 | 7/1990 | House et al. | 123/520 |
| 4,951,637 | 8/1990 | Cook | 123/520 |
| 4,953,514 | 9/1990 | Beicht et al. | 123/521 |
| 4,986,246 | 1/1991 | Kessler de Vivie et al. | 123/520 |
| 5,054,455 | 10/1991 | Cook | 123/520 |
| 5,069,188 | 12/1991 | Cook | 123/520 |
| 5,083,546 | 1/1992 | Detweiler et al. | 123/520 |

FOREIGN PATENT DOCUMENTS

| | | | |
|---|---|---|---|
| 1221443 | 3/1986 | U.S.S.R. | 251/129.21 |

*Primary Examiner*—E. Rollins Cross
*Assistant Examiner*—Thomas N. Moulis
*Attorney, Agent, or Firm*—Edwin E. Greigg; Ronald E. Greigg

[57] ABSTRACT

A tank vent valve for the metered admixing of volatilized fuel to the fuel/air mixture of an internal combustion engine has a valve housing with inflow and outflow sockets, between which is arranged an electromagnetically operable seated valve, which is spring loaded in the closing direction by a valve closing spring. For the simple design of the tank valve, the valve opening of the seat is arranged as a ring gap nozzle in the return yoke of the electromagnet, and the valve double seat which acts in conjunction with the valve member and which surrounds the ring gap nozzle is arranged on that side of the return yoke which faces the inflow socket. For setting the stroke of the valve member, the hollow cylindrical magnet core of the magnet housing can be threaded by means of an adjusting thread in the magnet housing. Supported on the magnet core is a valve closing spring, which loads the valve member which is formed by the armature of the electromagnet, in the closing direction.

16 Claims, 2 Drawing Sheets

VALVE FOR METERED ADMIXING OF VOLATILIZED FUEL TO THE FUEL/AIR MIXTURE OF AN INTERNAL COMBUSTION ENGINE

STATE OF TECHNOLOGY

The invention concerns a valve for the metered admixing of fuel which has volatilized from the fuel tank of an internal combustion engine, to the fuel/air mixture, which is fed to the internal combustion engine via an inlet manifold.

Based on the statutory requirements in some countries for the protection of the environment, the fuel which volatilizes in a fuel tank, known as the petrol vapour, must not be vented to the atmosphere, but must be burned within the internal combustion engine. For this purpose, the vent socket of the fuel tank is connected to a reservoir filled with activated carbon, which takes in the volatilized fuel when the internal combustion engine is stationary, and discharges it again when the engine is running. For this purpose, the reservoir is connected to the internal combustion engine via a suction line from the induction manifold, where the fuel vapour is admixed to the fuel/air mixture. The possible increase in exhaust gas emission resulting from this, requires admixing of the fuel vapour only in certain operating conditions of the internal combustion engine and in certain quantities. This is effected by the tank vent valve mentioned earlier, which is arranged in the induction manifold between the reservoir and the suction pipe and which is opened and closed by electronic control, preferably timed, depending on the operating condition of the internal combustion engine and the exhaust gas emission, which is measured with a lambda probe. In order to prevent running-on after switching off the engine, the seated valve which is integrated in the tank vent valve is designed currentless. The dual function of the annular valve member, which at the same time forms the armature of the electromagnet, facilitates a low movable armature mass and hence brief switching periods of the seated valve.

With such tank vent valves, it is desirable to adapt the stroke of the valve member on the pressure difference between the pressures upstream and downstream of the valve seat in such a way that the stroke is small during off-load running of the engine (large pressure difference) and that it becomes increasingly larger as the engine load increases (reducing pressure difference).

With such a stroke adaptation and the thus effected change of the cyclically opened cross-section of flow, greater accuracy is achieved in the control of small throughput quantities with a large pressure difference on the valve seat (off-load running) which does not require extremely small switching times, such as would be required with a constant valve stroke for the control of these small throughput quantities. The electromagnet can thus be built small and of light weight.

In a known tank vent valve of the type mentioned earlier (DE 38 44 453 AI), such a stroke adaptation is implemented by the valve double seat with the valve opening being configured on an intermediate ring which is clamped in a housing, and also by that side of the intermediate ring which faces the inflow socket, having a bellows attached by one of its front faces, the other front face being fixed to the bottom of a pot which embraces the bellows with radial separation. The rim of the pot changes into an annular collar which protrudes radially beyond the annular valve opening, this collar having a number of axial holes which are distributed in a circumferential direction and which are aligned in an axial direction with the valve opening. On its side which faces the pot, the intermediate ring has a sealing seat which surrounds the valve opening on the inside and the outside, and which acts together with the annular collar of the pot which functions as a closing member. If the vacuum pressure increases on the inflow socket, then the bellows contract. The annular collar approaches the sealing seat, and the flow cross-section at the sealing seat is reduced. The limit is reached when the annular collar of the pot rests on the sealing seat. The axial holes in the annular collar then determine the remaining opening cross-section of the seat valve.

Such a design arrangement of the tank vent valve is very elaborate in its construction and therefore requires relatively high manufacturing costs.

ADVANTAGES OF THE INVENTION

The tank vent valve in accordance with the invention, has the advantage of creating a seated valve, at low manufacturing costs, which is closed free from potential, with a valve member stroke which is largely governed by the pressure difference upstream and downstream of the valve seat. Due to the jet action of the ring gap nozzle, increasing negative pressure in the suction pipe of the engine, and hence on the outflow socket of the tank vent valve, causes the valve member and the armature to be more strongly drawn into the direction of the valve double seat. This suction force acts in opposition to the force of the electromagnet. The integration of the ring gap nozzle in the return yoke eliminates the need for a separate valve seat support, and the valve becomes less expensive to manufacture. Because of the suction effect of the ring gap nozzle, the valve closing spring, which acts in the suction direction, can be made very much smaller. The screwed connection between the magnet core and the magnet housing facilitates a simple axial displacement of the magnet core and thus a very simple setting of the stroke stop for the armature.

In accordance with a preferred embodiment of the invention, the ring gap nozzle is arranged in the base of a cavity in the return yoke, and the valve member or the armature is arranged axially displaceable, with a small radial separation in the cavity, by means of a leaf spring held in the valve housing, preferably made of non-magnetic material. This ensures a simple guidance of the armature. The leaf spring is of such tolerance that any lateral magnetic tilting of the armature is prevented.

The volatilized fuel, which flows from the inflow socket via the seated valve to the outflow socket, in accordance with a further embodiment of the invention, is passed through both the hollow cylindrical magnet core and through axial channels between the magnet housing and the valve housing. This allows efficient dissipation of the heat generated in the cyclic operation of the electromagnet.

When the tank vent valve is used in supercharged engines, a non-return valve is required, which opens towards the outflow socket. In accordance with a further embodiment of the invention, such a non-return valve is integrated in the valve housing in a simple manner, between the valve seat and the outflow socket. The valve seat of the non-return valve is arranged on the valve housing, and its valve member is pressed onto the valve seat with a valve spring which is supported on the outflow socket. Drawing The invention is described in more detail below and by means of an embodiment example represented in the drawing. The drawing shows:

FIG. 1 a longitudinal section of a tank vent valve,

FIG. 2 a longitudinal section of a return yoke of an electromagnet in the tank vent valve according to FIG. 1, FIG. 3 a top view of the return yoke of FIG. 2.

DESCRIPTION OF THE EMBODIMENT EXAMPLE

Figure 1:
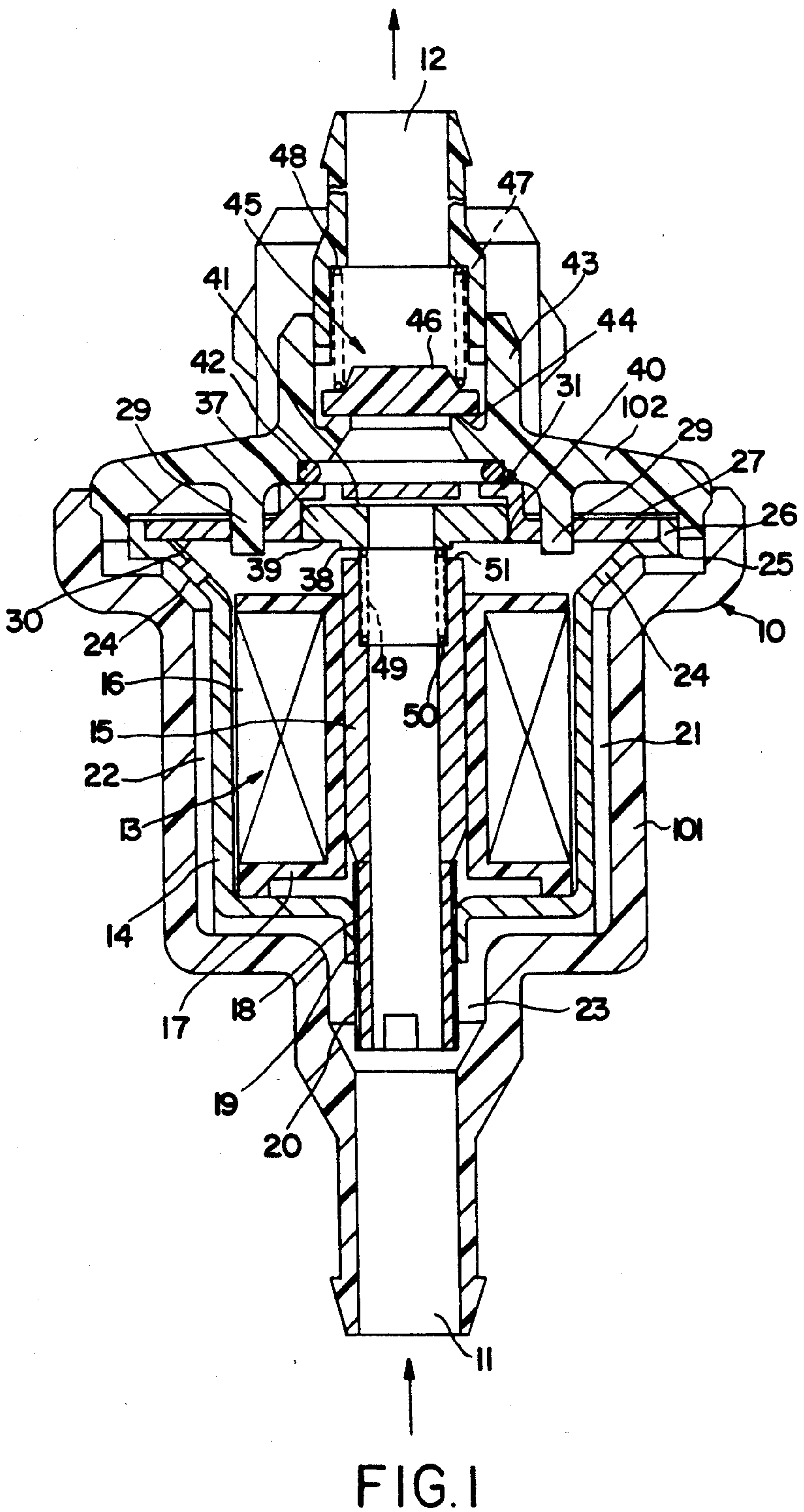

The valve, shown schematically in longitudinal section in FIG. 1, for the metered admixing of fuel which has volatilized from the fuel tank of an internal combustion engine, via a suction pipe, to the fuel/air mixture, hereafter referred to as the tank vent valve, is used in an output unit for the introduction of volatilized fuel into an internal combustion engine, such as the one described in the DE 35 19 292 A1. The tank vent valve has a two-part valve housing 10 with a pot shaped housing part 101 and a cap-like housing part 102 which closes the housing part 101. The housing part 101 supports an inflow socket 11 for the connection to a vent socket of the fuel tank or to a reservoir, downstream from it, which is filled with activated carbon for the volatilized fuel, while the housing part 102 supports an outflow socket 12 for the connection to the induction manifold of the internal combustion engine. The inflow socket 11 and the outflow socket 12 are arranged axially in the housing parts 101 and 102. Arranged inside the pot-shaped housing part 101 is an electromagnet 13. It has a pot-shaped magnet housing 14 with a coaxial, hollow cylindrical magnet core 15 which penetrates the pot bottom, and a cylindrical field coil 16 which is seated on a coil support 17 and which rests in the magnet housing 14, embracing the magnet core 15. Arranged at the bottom of the magnet housing 14 in one piece is an outwardly projecting threaded neck 18 with an internal thread 19, within which an externally threaded section 20 is threaded on the hollow cylindrical magnet core 15. By turning the threaded section 20, the magnet core 15 can be axially displaced in the magnet housing 14. The magnet core 15 rests flush with the inflow socket 11, so that the volatilized fuel which flows in at this point passes directly into the magnet core 15 and flows through the magnet core. The magnet housing 14 with the magnet core 15 is arranged in the pot-shaped housing part 101 in such a way that axial channels remain between the outer casing of the magnet housing 14 and the inner casing of the valve housing 10, which are circumferentially displaced by equal angles. The longitudinal section of FIG. 1 shows only the two diametrically opposed axial channels 21,22. These channels 21,22 are linked, on the one hand, via an annular space 23 which remains between the valve housing 10 and the externally threaded section 20 of the magnet core 15, with the inflow socket 11 and, on the other hand, via holes 24 which are provided in the magnet housing 14 near the open end of the magnet housing 14; with the interior of the magnet housing 14. The volatilized fuel which emerges from the inflow socket 11 flows through these axial channels 21,22 and also around the magnet housing 14 and dissipates the heat which develops there.

Figure 2:
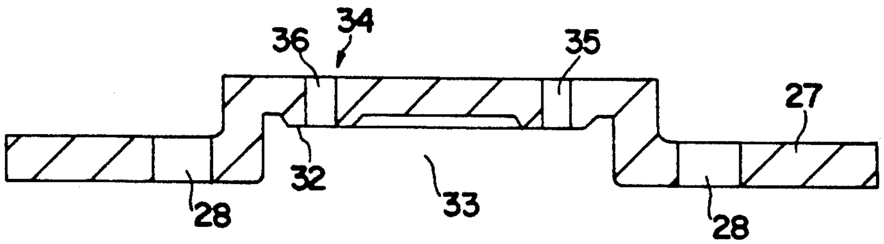
Figure 3:
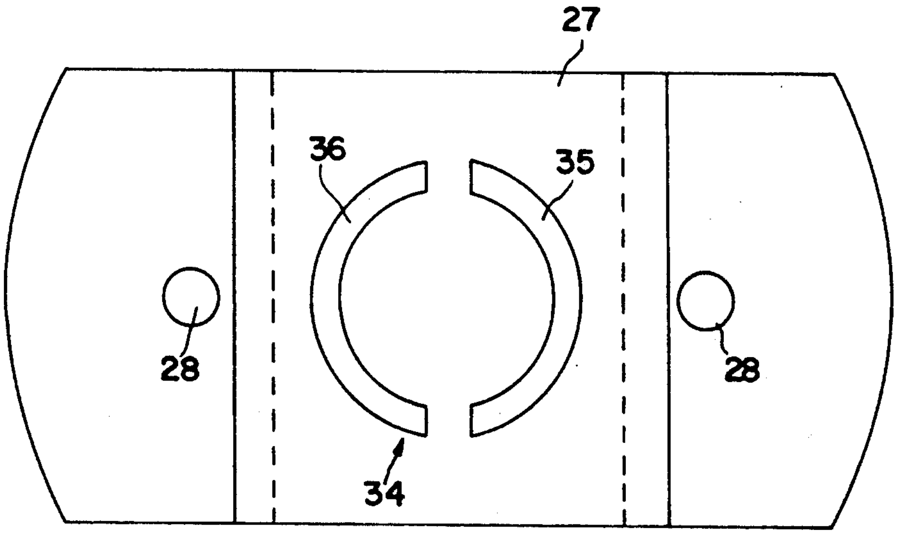

The edge of the magnet housing 14 is angled to the outside to form an annular support flange 25, which is bent at the end to form an axially protruding annular link 26. The support flange 25 is used for locating a return yoke 27 which covers the magnet housing 14 and rests on the edge against the annular link 26. The return yoke 27 shown in section in FIGS. 2 and 3, and magnified in the plan view is positioned by two locating holes 28, on two holding spigots 29 in the cap shaped housing part 102, which project axially on the underside which faces the housing part 101. On engagement of the cap-type housing part 102 in the pot-type housing part 101, the return yoke 27 is accurately seated into the support flange 25 with the annular link 26 nad is firmly clamped in it. Between the support flange 25 and the return yoke 27, a leaf spring 30, made of nonmagnetic material such, as bronze, is clamped and centred on the holding spigot 29 and supports the armature of the electromagnet 13.

The electromagnet 13 is used for the timed switching of a seated valve 31, which is arranged between the inflow socket 11 and the outflow socket 12. The seated valve 31 has a valve double seat 32 (FIG. 2), which is arranged at the base of a cavity 33 in the return yoke 27, on that side which faces the inflow socket 11. The cavity 33 is designed so that the base of the recess 33 which supports the valve double seat 32 points to the magnet core 15. The valve double seat 32 coaxially embraces externally and internally a ring gap nozzle 34, which is constructed as two symmetrical semi-circular arc gap 35,36 in the return yoke 27. Acting in conjunction with the valve double seat 32 is a valve member in the form of a ring disc 37 of magnetic material, which at the same time forms the armature of the electromagnet 13. With a centering arrangement 38, the ring disc 37 engages through a circular recess in the leaf spring 30 and is fixed to this. The ring disc 37 is dimensioned so that its axial thickness is slightly less than the clearance diameter of the cavity 33, so that only an extremely small ring gap 40 remains between the outer circumference of the ring disc 37 and the inner casing of the cavity 33. The leaf spring is toleranced such as to reliably prevent any lateral magnetic tilting of the ring disc 37. The ring disc 37 carries on its side which faces the valve double seat 32 a rubber seal 41. In the locking condition of the seated valve 31, the ring disc 37 is pressed with its side which carries the rubber seal 41 onto the valve double seat 32 by the action of a valve closing spring 49. During this action, the valve closing spring 49 is, on the one hand, supported on the ring disc 37 and, on the other hand, on an annular support shoulder 50, which is arranged on the inner wall of the hollow cylindrical magnet core 15. The free face of the magnet core 15 forms a stop 51 for the stroke movement of the ring disc 37. The adjusting thread, which is formed by the internal thread 19 and the external thread section 20, allows the stop 51 to be displaced axially and thereby determining the quantity of flow with seat valve 31 opened to its maximum. The valve closing spring 49 is of small size, since a suction effect on the ring disc 37 is exerted in the direction of valve closing when there is a pressure difference between the outflow socket 12 and the inflow socket 11, this suction effect thus supporting the closing action of the valve spring 49.

The rear of the return yoke 27 which faces away from the valve double seat 32 is sealed by a sealing ring 42 against the housing part 102, so that any leakage losses via the connection of the return yoke 27 and the magnet housing 14 are avoided. The outflow socket 12 is engaged in an outflow socket 12 which is designed coaxially on the housing part 102. A valve seat 44 of a non-return valve 45 is arranged in the locating socket 43 on a radially inward projecting ring shoulder, and a valve body 46 is pressed onto it by a valve spring 47. The valve spring 47 is supported on a shoulder 48 which is provided within a locating socket 43. The non-return valve 45 is needed when the tank vent valve is to be used in supercharged engines.

The method of operation of the tank vent valve described above is as follows:

When the electromagnet 13 is without current, the seated valve 31 is closed, since the ring disc 37 with its rubber seal 41 is pressed onto the valve double seat 32 by the valve closing spring 49. During operation of the internal combustion engine, the electromagnet 13 is controlled by an electronic timing system. The timing frequency is conditioned by the operating condition of the internal combustion engine, so that the flow quantity of volatilized fuel flowing via the seat valve 31 from the inflow socket 11 into the outflow socket 12 is metered accordingly. Superimposed on this electromagnetic control of the seated valve 31 is an influence exerted by the stroke of the ring disc 37, which is due to the suction of the ring gap nozzle 34. The larger the pressure difference between the outflow socket 12 and the inflow socket 11, which reaches the maximum at no-load running of the engine, the larger is the suction action of the ring gap nozzle 34 and hence the suction force which acts on the ring disc 37 in opposition to the force of the electromagnet 13. As the load on the internal combustion engine increases, the negative pressure of the outflow socket 12 reduces, and it becomes minimal at full load. The pressure difference between the inflow socket 11 and the outflow socket 12 is small, and so too is the suction on the ring gap nozzle 34. With the electromagnet 13 being energized, the ring disc 37 performs its full stroke up to the stop 51. The flow quantity then passing through the aperture cross-section can be adjusted with high accuracy by rotatint the magnet core 15 in the thread adjustment 19,20.

The invention is not restricted to the embodiment example described. Instead of centering the leaf spring 30 on the housing part 102, this can be done on the return yoke 27 by means of spigots of the same type.

The foregoing relates to a preferred exemplary embodiment of the invention, it being understood that other variants and embodiments thereof are possible within the spirit and scope of the invention, the latter being defined by the appended claims.

We claim:

1. A valve for the metered admixing of fuel, which has volatilized from a fuel tank of an internal combustion engine, to a fuel/air mixture which is fed to the internal combustion engine via an induction manifold, a valve housing which has an inflow socket for a first connection to a vent socket of the fuel tank or to an activated carbon reservoir which is connected downstream from the fuel tank, for the volatilized fuel, an outflow socket for a second connection to an induction manifold, a seat valve, which is arranged inside the valve housing between said inflow and outflow sockets, a valve double seat surrounding an annular valve opening, an annular valve member which acts in conjunction with said valve double seat, said annular valve member being loaded by a valve closing spring in the direction of valve closing, and operable by an electromagnet in the direction of the valve opening, this electromagnet having a pot shaped magnet housing which is arranged coaxially relative to the valve opening, a hollow cylindrical magnet core arranged centrally in the magnet housing, a field coil which lies in the annular space between the magnet core and the magnet housing, a return yoke covering the magnet housing, and an armature which forms the valve member and which is of magnetically conductive material, the valve opening is arranged as a ring gap nozzle (34) in the return yoke (27) and that the valve double seat (32) is designed on the side of the return yoke (27) which faces the inflow socket (11), and that the hollow cylindrical magnet core (15) can be screwed into an adjusting thread (19, 20) provided in the base of the magnet housing (14) and carries a shoulder (50) for the valve closing spring (49) which is supported against the armature (37).

2. A valve in accordance with claim 1, in which the ring gap nozzle (34) is arranged at a base of a cavity (33) in the return yoke (27) and that the armature (37) is axially slidable in the cavity (33) with a small radial separation.

3. A valve in accordance with claim 2, in which the armature (37) is fixed to a leaf spring (30) which is clamped in the valve housing (10) and that the leaf spring (30) is toleranced so that any tilting of the armature (37) in the cavity (33) is reliably prevented.

4. A valve in accordance with claim 3, in which the leaf spring (30) consists of a non-magnetic material such as copper and bronze, for example.

5. A valve in accordance with claim 1, in which axial channels (21, 22) are provided between the magnet housing (14) and the valve housing (10), which are linked with the inflow socket (11) and with the interior of the magnet housing (14) via openings (24) arranged near the return yoke (27) in the magnet housing (14).

6. A valve in accordance with claim 2, in which axial channels (21, 22) are provided between the magnet housing (14) and the valve housing (10), which are linked with the inflow socket (11) and with the interior of the magnet housing (14) via openings (24) arranged near the return yoke (27) in the magnet housing (14).

7. A valve in accordance with claim 3, in which axial channels (21, 22) are provided between the magnet housing (14) and the valve housing (10), which are linked with the inflow socket (11) and with the interior of the magnet housing (14) via openings (24) arranged near the return yoke (27) in the magnet housing (14).

8. A valve in accordance with claim 4, in which axial channels (21, 22) are provided between the magnet housing (14) and the valve housing (10), which are linked with the inflow socket (11) and with the interior of the magnet housing (14) via openings (24) arranged near the return yoke (27) in the magnet housing (14).

9. A valve in accordance with claim 1, in which between the outflow socket (12) and that side of the return yoke (27) which faces the one flow socket, a non-return valve (45) is arranged in the valve housing (10), the valve seat (44) of which is designed on the valve housing (10) and the valve member (46) of which is pressed onto the valve seat (44) by a valve spring (47) which is supported on the outflow socket (12).

10. A valve in accordance with claim 2, in which between the outflow socket (12) and that side of the return yoke (27) which faces the one flow socket, a non-return valve (45) is arranged in the valve housing (10), the valve seat (44) of which is designed on the valve housing (10) and the valve member (46) of which is pressed onto the valve seat (44) by a valve spring (47) which is supported on the outflow socket (12).

11. A valve in accordance with claim 3, in which between the outflow socket (12) and that side of the return yoke (27) which faces the one flow socket, a non-return valve (45) is arranged in the valve housing (10), the valve seat (44) of which is designed on the valve housing (10) and the valve member (46) of which is pressed onto the valve seat (44) by a valve spring (47) which is supported on the outflow socket (12).

12. A valve in accordance with claim 4, in which between the outflow socket (12) and that side of the return yoke (27) which faces the one flow socket, a non-return valve (45) is arranged in the valve housing (10), the valve seat (44) of which is designed on the valve housing (10) and the valve member (46) of which is pressed onto the valve seat (44) by a valve spring (47) which is supported on the outflow socket (12).

13. A valve in accordance with claim 5, in which between the outflow socket (12) and that side of the return yoke (27) which faces the one flow socket, a non-return valve (45) is arranged in the valve housing (10), the valve seat (44) of which is designed on the valve housing (10) and the valve member (46) of which is pressed onto the valve seat (44) by a valve spring (47) which is supported on the outflow socket (12).

14. A valve in accordance with claim 6, in which between the outflow socket (12) and that side of the return yoke (27) which faces the one flow socket, a non-return valve (45) is arranged in the valve housing (10), the valve seat (44) of which is designed on the valve housing (10) and the valve member (46) of which is pressed onto the valve seat (44) by a valve spring (47) which is supported on the outflow socket (12).

15. A valve in accordance with claim 7, in which between the outflow socket (12) and that side of the return yoke (27) which faces the one flow socket, a non-return valve (45) is arranged in the valve housing (10), the valve seat (44) of which is designed on the valve housing (10) and the valve member (46) of which is pressed onto the valve seat (44) by a valve spring (47) which is supported on the outflow socket (12).

16. A valve in accordance with claim 8, in which between the outflow socket (12) and that side of the return yoke (27) which faces the one flow socket, a non-return valve (45) is arranged in the valve housing (10), the valve seat (44) of which is designed on the valve housing (10) and the valve member (46) of which is pressed onto the valve seat (44) by a valve spring (47) which is supported on the outflow socket (12).

* * * * *